United States Patent [19]

Crook et al.

[11] Patent Number: 4,487,630
[45] Date of Patent: Dec. 11, 1984

[54] WEAR-RESISTANT STAINLESS STEEL

[75] Inventors: Paul Crook, Kokomo; Richard D. Zordan, Indianapolis, both of Ind.

[73] Assignee: Cabot Corporation, Kokomo, Ind.

[21] Appl. No.: 436,233

[22] Filed: Oct. 25, 1982

[51] Int. Cl.³ .............................................. C22C 33/00
[52] U.S. Cl. ................................ 75/123 B; 75/123 K; 75/123 J; 75/126 A; 75/126 C; 75/126 R; 75/126 H; 75/125; 75/126 E; 75/123 CB; 75/128 F; 148/38; 420/452; 420/453; 420/585
[58] Field of Search ............... 428/585, 614; 420/585, 420/452; 75/123 B, 125, 126 E, 128 R, 123 CB; 148/38

[56] References Cited

U.S. PATENT DOCUMENTS 2,899,302  8/1959  Cape et al. .......................... 420/452
4,425,300  1/1984  Teramoto et al. .................. 420/453

Primary Examiner—Veronica O'Keefe
Attorney, Agent, or Firm—Jack Schuman; Joseph J. Phillips

[57] ABSTRACT

A high chromium stainless steel especially suited for use as wear (galling) resisting components, for example, valve parts. A typical alloy generally contains chromium, nickel, silicon, carbon, an effective cobalt content and the balance iron plus normal impurities. The alloy may be produced in the form of castings, P/M products, hardfacing and welding materials and wrought mill products.

8 Claims, 1 Drawing Figure

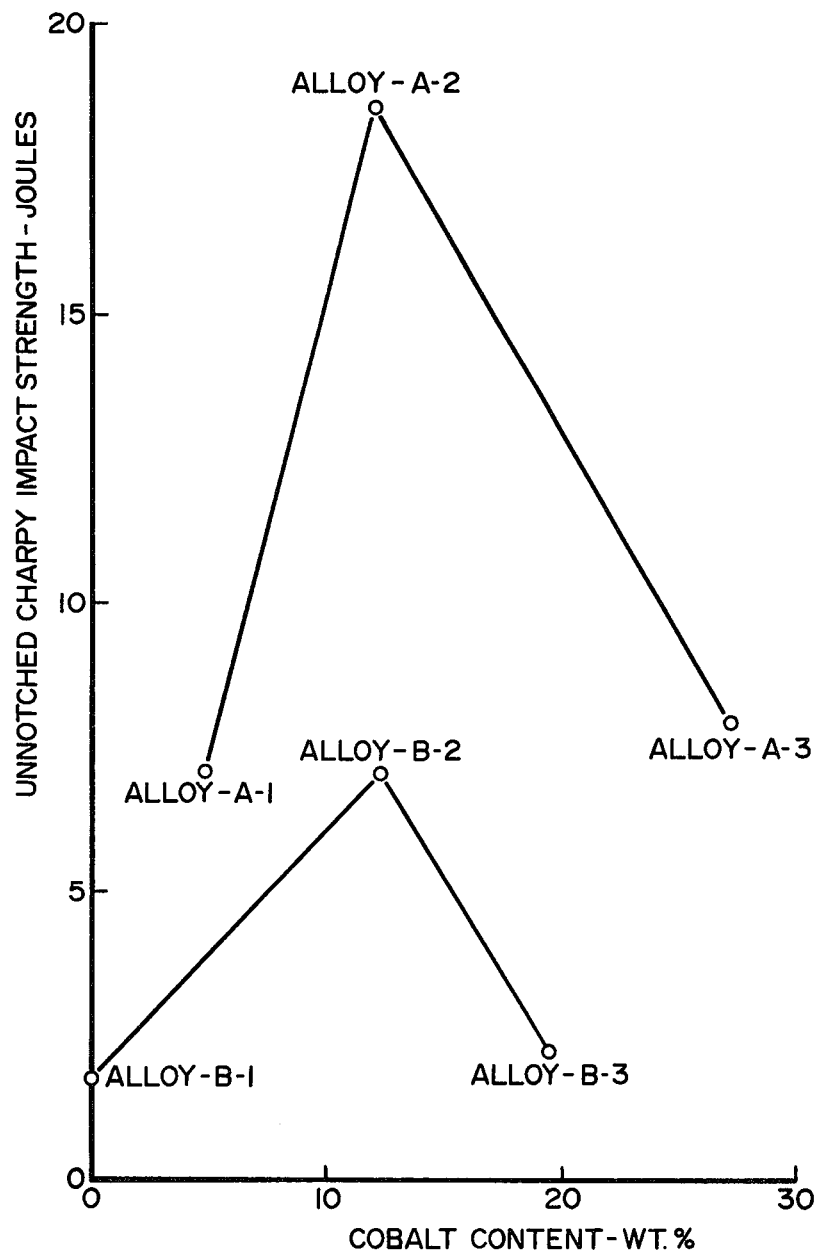

WEAR-RESISTANT STAINLESS STEEL

This invention relates to iron-base alloys and, more particularly, to a high chromium stainless steel suitable for severe service wear-resistant applications, such as valve components.

Stainless steel has been in the state of constant development and improvement since its invention as an Fe-Cr-Ni corrosion resistant steel. There are hundreds of varieties of stainless steels. Many have been designed for specific uses. The prior art is replete with modifications in steel compositions to provide desired specific properties as required.

There is a critical need for a low cost alloy resistant to corrosion and mechanical wear as now provided by cobalt-base alloys. A well-known alloy of this class is marketed as STELLITE ® alloy No 6 containing typically 28 chromium, 4.5 tungsten, 1.2 carbon, balance cobalt. Because of the low cost and availability of iron, some iron base alloys have been proposed for wear applications. For example, U.S. Pat. No. 2,635,044 discloses the basic 18-8 stainless steel with additions of molybdenum, beryllium and silicon as a hardenable stainless steel resistant to galling and erosion-corrosion when heat treated.

PRIOR ART

U.S. Pat. No. 1,790,177 discloses a wear resistant steel alloy suitable for use as drilling tools and welding rods. This steel contains only chromium, nickel, silicon and carbon as the essential elements with chromium 25 to 35% as the principal feature. U.S. Pat. No. 2,750,283 discloses the addition of boron to enhance the hot rolling characteristics of nearly every known chromium-iron alloys with or without nickel, carbon, silicon, manganese, molybdenum, tungsten, cobalt or other optional elements. U.S. Pat. No. 4,002,510 discloses the addition of silicon to 18-8 stainless steels to promote the formation of delta ferrite, thus enhancing resistance to stress corrosion cracking.

As used herein, all compositions are given in percent by weight.

U.S. Pat. Nos. 3,912,503 and 4,039,356 relate to a modified 18-8 stainless steel with critical contents of manganese and silicon. Known also in the art is an analogous commercial steel under ARMCO Inc.'s, trademark NITRONIC 60 containing typically, in weight percent, 0.10 max. carbon, 8 manganese, 4 silicon, 17 chromium, 8.5 nickel and 0.13 nitrogen. Data show these steels have good wear properties, especially in galling tests.

Metal wear in industrial and consumer mechanical operations continues to be an expensive and, at times, hazardous problem. Conditions of wear environment are so diverse that there can be no optimum or perfect wear-resistant alloy to solve all problems. Furthermore, cost and availability of elements to produce certain wear-resistant alloys become an important consideration. The art is constantly searching for new and improved alloys to satisfy these needs.

For example, valve components subjected in service to chemically aggressive media are constructed either from the stainless steels or high nickel alloys. Typically, the stainless 304 is selected by the food processing industry and for other systems which involve mild corrodants, 316 is well used by the chemical processing industry, and the high nickel alloys are selected when severely aggressive media are present.

A major drawback of the 300 Type stainless steels and the high nickel alloys, however, is their tendency to gall (i.e., suffer from severe surface damage) when they are subjected to relative motion under the high loads inherent in valve operation. Of particular concern, in this respect, are the valve seat faces, which must retain their integrity for sealing purposes.

Generally speaking, the 300 Series Steels are the basic corrosion resistant stainless steels. As a means to reduce the use of nickel, the 200 Series Stainless steels were developed wherein manganese and nitrogen were substituted for a portion of the nickel. These 200 Series Steels were found to have improved mechanical strengths over the 300 Series Steels for some uses. To improve the galling resistances of these alloys, higher silicon contents were added resulting in the alloys of NITRONIC 60 type. NITRONIC 60 has improved galling resistance when compared to the 200 and 300 Series Steels.

Experiments have shown NITRONIC 60 to have a high degree of resistance to galling when the alloy is coupled to itself. However, there is only limited resistance to galling when coupled with other counterface materials, in particular the 300 Series Steels and high nickel alloys. Thus, there is a limitation in the use of these alloys in the art.

Furthermore, in the general production of nitrogen containing alloys, experience has shown that nitrogen content is difficult to control. Nitrogen tends to promote gas problems during welding. Manganese appears to be the source of serious deterioration of certain furnace lining materials.

OBJECTS

Therefore it is a principal object of this invention to provide an alloy that has a higher degree of wear resistance than is now available.

It is another principal object of this invention to provide an alloy that is more wear resistant under a variety of wear conditions.

Other objects of this invention may be discerned by those skilled in the art from the alloy of this invention as disclosed in Table 1.

THE INVENTION

Table 1 presents the ranges of composition that define various embodiments of the alloy of this invention. The Broad range in Table 1 defines the scope wherein some advantage of the invention may be obtained under certain circumstances. The Preferred range in Table 1 defines the scope wherein a higher degree of advantages may be obtained. Data show that many properties are improved with compositions within this range. The More Preferred range in Table 1 defines the scope wherein a more desirable combination of engineering properties are obtained.

The Typical alloy defined in Table 1 is the optimum composition of one embodiment of the invention. The typical alloy has an effective working scope essentially as defined in the Typical Range as shown in Table 1.

TABLE 1

| | ALLOY OF THIS INVENTION Composition, in weight percent | | | | |
|---|---|---|---|---|---|
| ELEMENT | BROAD | PREFERRED | MORE PREFERRED | TYPICAL | TYPICAL RANGE |
| Cr | 10–40 | 15–40 | 25–40 | 30 | 28.5–31.5 |
| Ni | 5–15 | 7–13 | 7–13 | 10 | 9–11 |
| Ni + Mn | 20 max | 15 max | 15 max | about 10 | — |
| Si | 3–7 | 3.5–6 | 4–5.5 | 4.7 | 4.4–5.2 |
| C | — | — | — | 1 | .85–1.15 |
| C + B | .25–3.5 | .75–3.0 | .75–2.5 | about 1 | — |
| $N_2$ | .2 max | .15 max | 0.10 max | — | — |
| Fe plus impurities | Bal | Bal | Bal | Bal | Bal |
| Co | 5–30 | 5–20 | 9–15 | 12 | 11–13 |
| Carbide boride formers* | 10–40 | 15–40 | 25–40 | about 30 | about 30 |

*Molybdenum, tungsten, vanadium, tantalum, columbium, titanium, chromium, zirconium and hafnium Chromium is present in the alloy of this invention to provide corrosion resistance and to promote the formation of chromium carbides, chromium borides and the like. Less than 10% chromium will not provide sufficient corrosion resistance while over 40% chromium content will tend to reduce ductility of the alloy.

Nickel must be present to promote an austenitic structure in the alloy. At least 5% nickel is required to be effective; but over 15% does not provide additional benefits. Test results show that the nickel at only 5.12% there is a high degree of galling damage with the alloy coupled with a high nickel alloy. With nickel at 14.11% there is also poor galling resistance with a high nickel alloy and when the 14.11% nickel alloy is coupled with itself.

Silicon must be present in the alloy to enhance the anti-galling characteristics of the alloy. Less than 3% is not sufficient while over 7% will embrittle the alloy.

The alloy of this invention is enhanced with the formation of carbides and borides of a group of elements including molybdenum, tungsten, vanadium, tantalum, columbium, titanium, chromium, zirconium, hafnium and others known in the art. Carbides and borides of iron, of course, may be formed. To obtain these carbides and borides in the alloy in effective amounts, carbon and boron must be present totaling not less than 0.25%. Over 3.5% total carbon and boron will tend to reduce the ductility of the alloy. The total content of carbide or boride formers (other than iron) listed above must be present not less than 10% to be effective; but, over 40% will tend to reduce ductility and further add to costs.

It is understood that the carbides and borides may be in the form of complex structures with three or more elements, for example, a chromium iron carbide. Of course, at least a portion of the carbide-boride former elements may be found in the matrix.

Nitrogen may be beneficial in the alloy of this invention for some applications and may be present in an effective amount not more than 0.2% to avoid the formation of excessive nitrides and avoid problems related to gas in weldments.

Cobalt is especially critical in the composition of the alloy. Subsequent data will show a controlled content of cobalt provides essential features of the alloy, and, in particular, impact strength. Cobalt content must be at least 5% to provide an effective increased impact strength. Over about 30% cobalt the beneficial effects of cobalt are lost and no additional improvement is provided in view of the additional costs. Actual test results show the optimum cobalt content is about 12%. Thus, a preferred range of cobalt at 5 to 20% is suggested for best advantage of the invention.

In a series of tests the criticality of cobalt was tested in two iron base alloys. Alloy A is essentially alloy 6781 in Table 2 except for cobalt. Alloy B contained 20.37 chromium, 9.83 nickel, 4.74 silicon, 2.2 carbon and 7.93% vanadium. Cobalt additions were made in the basic Alloys A and B. The resulting alloys were tested for impact strength. Tests were performed on the standard Charpy impact testing unit and values were obtained in joules from unnotched specimens. Data are presented in Table 3 and graphically in the attached FIGURE.

The data and the FIGURE clearly show that a controlled content of cobalt dramatically affects impact strengths. The data show that about 12% is the optimum cobalt content. The effect of cobalt continues to be beneficial up to about 30% cobalt content for Alloy A and 20% cobalt content for Alloy B.

The data also show that basic Alloy A generally has higher impact strength; however, the influence of cobalt in basic Alloy B is similar.

Considering all of the material combinations tested, data as shown in Table 4 show when cobalt is present at only 4.86% (Alloy A-1), general resistance to galling is less than the alloy containing 11.95% (Alloy A-2). However, increased cobalt content to 26.92% (Alloy A-3) results in little improvement in resistance to galling. As a means to make direct comparision with known prior art alloys, Table 4 also presents data for STELLITE alloy 6, NITRONIC 60 and HASTELLOY alloy C-276 the well known nickel base alloy. The galling test procedure will be described hereinafter.

These wear data show the alloy of this invention to be comparable to or better than typical commercially available alloys.

In view of these data, it is suggested the maximum cobalt content should be 30% and, preferably, at 20% in view of cobalt costs.

Manganese is not essential in the alloy of this invention but may be present in the alloy together with nickel in a total amount not exceeding 20%.

TABLE 2

| | Example Alloys of this invention in wt. % | |
|---|---|---|
| | ALLOY 6781 | ALLOY 6781-W |
| Cr | 29.54 | 29.07 |
| Ni | 9.72 | 11.08 |
| Ni + Mn | — | 11.58 |

TABLE 2-continued

| | Example Alloys of this invention in wt. % | |
|---|---|---|
| | ALLOY 6781 | ALLOY 6781-W |
| Si | 4.73 | 4.23 |
| C | 1.07 | 1.07 |
| $N_2$ | .06 | .01 |
| Fe plus impurities | Bal | Bal |
| Co | 11.95 | 10.82 |

TABLE 3

EFFECTS OF COBALT

| | Cobalt Content | Unnotched Impact Strength, Joules | ft. lbf. |
|---|---|---|---|
| Basic Alloy A | | | |
| A - 1 | 4.86% | 7.1 | 5.2 |
| A - 2 | 11.95% | 18.6 | 13.7 |
| A - 3 | 26.92% | 8.1 | 6.0 |
| Basic Alloy B | | | |
| B - 1 | 0 | 1.7 | 1.3 |
| B - 2 | 12.33 | 7.1 | 5.2 |
| B - 3 | 19.37 | 2.4 | 1.8 |

TABLE 4

Galling Test Data
(Micrometers (μm) can be converted to microinches by Multiplying micrometers by 39.4)

| TEST COUPLE | DEGREE OF DAMAGE* -μm | | |
|---|---|---|---|
| | (3000 lb.) 1360.8 kg | (6000 lb.) 2721.6 kg | (9000 lb.) 4082.3 kg |
| STELLITE alloy No. 6 v. STELLITE alloy No. 6 | 1.25 | 2.50 | 1.88 |
| STELLITE alloy No. 6 v. 304 Stainless Steel | 45.63 | 40.00 | 52.00 |
| STELLITE alloy No. 6 v. 316 Stainless Steel | 23.50 | 48.13 | 58.13 |
| STELLITE alloy No. 6 v. HASTELLOY alloy C-276 | 21.88 | 30.00 | 23.13 |
| STELLITE alloy No. 6 v. 410 Stainless Steel | 25.63 | 28.13 | 55.00 |
| NITRONIC 60 v. NITRONIC 60 | 2.50 | 120.00 | 111.25 |
| NITRONIC 60 v. 304 Stainless Steel | 40.63 | 111.25 | 85.63 |
| NITRONIC 60 v. 316 Stainless Steel | 38.13 | 97.50 | 118.75 |
| NITRONIC 60 v. HASTELLOY alloy C-276 | 3.25 | 53.75 | 115.00 |
| NITRONIC 60 v. STELLITE alloy No. 6 | 2.50 | 1.50 | 3.13 |
| Alloy A-1 v. Alloy A-1 | 1.00 | 0.63 | 0.75 |
| Alloy A-1 v. 304 Stainless Steel | 5.38 | 17.00 | 28.13 |
| Alloy A-1 v. 316 Stainless Steel | 52.50 | 46.25 | 55.00 |
| Alloy A-1 v. HASTELLOY alloy C-276 | 13.00 | 15.50 | 10.38 |
| Alloy A-1 v. STELLITE alloy No. 6 | 0.63 | 1.25 | 1.25 |
| Alloy A-2 v. Alloy A-2 | 1.25 | 1.50 | 1.50 |
| Alloy A-2 v. 304 Stainless Steel | 0.88 | 2.88 | 3.63 |
| Alloy A-2 v. 316 Stainless Steel | 11.00 | 22.88 | 35.63 |
| Alloy A-2 v. HASTELLOY alloy C-276 | 1.75 | 0.63 | 2.63 |
| Alloy A-2 v. 410 Stainless Steel | 2.50 | 3.00 | 7.25 |
| Alloy A-2 v. STELLITE alloy No. 6 | 1.13 | 1.13 | 1.13 |
| Alloy A-3 v. Alloy A-3 | 0.88 | 1.13 | 0.88 |
| Alloy A-3 v. 304 Stainless Steel | 1.38 | 1.25 | 2.88 |
| Alloy A-3 v. 316 Stainless Steel | 4.25 | 23.88 | 42.38 |
| Alloy A-3 v. HASTELLOY alloy C-276 | 2.13 | 0.88 | 2.25 |
| Alloy A-3 v. STELLITE alloy No. 6 | 2.13 | 1.75 | 2.13 | at about 2150° F. (1177° C.) then hot rolled at the same temperature in to plate and finally to about 1.59 mm (1/16 inch) thick sheet for testing. Galling test data show the alloy of this invention, in wrought form, to have outstanding anti-galling properties similar to the properties of the alloy in the form of hard-facing deposits.

The wrought alloy was impact tested by the standard test method well known in the art. Data are presented in Table 5.

Powder products may also be produced from the alloy of this invention. A composite product may be formed by the mixture of the alloy of this invention with hard particles, such as tungsten carbide, titanium diboride and the like.

TABLE 5

CHARPY IMPACT DATA

| | Impact Strength - Joules (ft. lbf.) | |
|---|---|---|
| Alloy | Notched | Unnotched |
| 6781-W | 5.4 (4.0) | 88.8 (65.5) |

The mixture is then further processed into a useful shape. In addition, components of the mixture may be added separately to a welding torch and the end product is a composite deposit.

EXAMPLES

A series of experimental alloys was prepared for testing.

The alloy examples for testing were induction melted and aspiration cast into glass tubes yielding 4.8 mm (0.188 inch) diameter weld rods. Depositions of the weld rods were made by gas tungsten arc melting. The deposits were fashioned into test specimens.

Alloy 6781-W of this invention was prepared in the form of wrought product. Table 2 shows the analysis of the alloy. The alloy was vacuum induction melted, then electroslag remelted (ESR). The ESR bars were forged The galling test used to generate the data in Table 4 involved:

a. the twisting back and forth (ten times through 2.1 rad [120°] arc) of a cylindrical pin (of diameter 15.9 mm) (0.625 inch) against a counterface block under load.

b. study of the test faces (which were initially in surface ground condition) by profilometry to determine the degree of damage incurred during sliding.

Tests were performed for each test coupled at three loads; 1360.8 kg (3000 lb), 2721.6 kg (6000 lb.) and 4082.3 kg (9000 lb). The pins were twisted manually by means of a wrench and the load transmitted by means of a ball bearing. The neck portion of the pins was designed to accommodate both the wrench and ball bearing.

Since metallic faces, subjected to sliding under high loads, tend to have irregular profiles, often featuring one or two deep grooves, it was deemed appropriate to measure degree of damage in terms of the change in maximum peak to valley amplitude (of the profile), rather than the change in average roughness (which would tend to mask the presence of any badly damaged regions).

In visual terms, the cylindrical pin and the block appear to suffer the same degree of damage in a given test. Only the blocks were used in the quantitative determination of damage, therefore, since they are more amenable to profilometry, allowing travel of the stylus to and beyond the circumference of the scar. For accuracy, the stylus was passed twice over each scar (one pass along the diameter parallel to the sides of the block; the other along the diameter perpendicular to it). Appreciable overlap of the adjacent unworn surface regions was affected to enable calculation of the initial peak to valley amplitude.

By considering each radius as a distinct region of the scar, four values of final peak to valley amplitude were measured per scar. The average of these four values was used to determine the degree of damage incurred, subtracting the average of four values of initial peak to valley amplitude.

The galling test procedure used to obtain galling evaluations described above was developed and modified from known test methods to provide more severe and more meaningful test results. Thus, the test data reported herein do not necessarily correspond directly with published data obtained by other test methods.

Unless otherwise stated, all galling tests reported herein were made under identical test conditions and the resulting test data are, therefore, valid in making direct comparisons among the various alloys tested herein.

What is claimed is:

1. An alloy consisting essentially of, in weight percent, 10 to 40 chromium, 5 to 15 nickel, 20 maximum nickel plus manganese, 3 to 7 silicon, 0.25 to 3.5 carbon plus boron, 0.2 maximum nitrogen, 10 to 40 one or more of molybdenum, tungsten, vanadium, tantalum, columbium, titanium, chromium, zirconium, and hafnium, 5 to 30 cobalt and the balance iron plus impurities.

2. The alloy of claim 1 containing 15 to 40 chromium, 7 to 13 nickel, 15 maximum nickel plus manganese, 3.5 to 6 silicon, 0.75 to 3.0 carbon plus boron, 0.15 maximum nitrogen, 5 to 20 cobalt, 15 to 40 one or more of molybdenum, tungsten, vanadium, tantalum, columbium, titanium, chromium, zirconium and hafnium.

3. The alloy of claim 1 containing 25 to 40 chromium, 7 to 13 nickel, 15 maximum nickel plus manganese, 4 to 5.5 silicon, 0.75 to 2.5 carbon plus boron, 0.10 maximum nitrogen, 9 to 15 cobalt, and 25 to 40 one or more of molybdenum, tungsten, vanadium, tantalum, columbium, titanium, chromium, zirconium and hafnium.

4. The alloy of claim 1 containing about 30 chromium, about 10 nickel, about 4.7 silicon, about 1 carbon, about 12 cobalt.

5. The alloy of claim 1 containing 28.5 to 31.5 chromium, 9 to 11 nickel, 4.4 to 5.2 silicon, 0.85 to 1.15 carbon, 11 to 13 cobalt.

6. The alloy of claim 1 wherein said cobalt is present within said range to provide combined good impact strength and good wear, especially galling, resistance.

7. The alloy of claim 1 in the form of at least one of the group a casting, a wrought product, a hardfacing material and a sintered powder metallurgy product.

8. The alloy of claim 1 as a component of a composite material wherein said alloy is the matrix with dispersions of hard particles.

* * * * *

UNITED STATES PATENT AND TRADEMARK OFFICE
CERTIFICATE OF CORRECTION

PATENT NO. : 4,487,630

DATED : 12/11/84

INVENTOR(S) : Paul Crook and Richard D. Zordan

It is certified that error appears in the above-identified patent and that said Letters Patent is hereby corrected as shown below:

IN THE SPECIFICATION, column 3 line 28 after "that" add --with--.

IN THE CLAIMS, claim 1 line 5 "An alloy" should read --A stainless steel--; claim 1 line 8 "one or more" should read --of at least one element selected from the group consisting--; claim 1 line 11 end of claim (.) should read --, said iron being the base element in the steel.--.

Claim 2 line 12 "alloy" should read --steel--.

Claim 3 line 18 "alloy" should read --steel--.

Claim 4 line 24 "alloy" should read --steel--.

Claim 5 line 27 "alloy" should read --steel--.

Claim 6 line 30 "alloy" should read --steel--.

Claim 7 line 33 "alloy" should read --steel-- also "the form of at least one of the group" should read --a form selected from the group consisting of--;

Claim 8 line 36 "alloy" should read --steel--.

Signed and Sealed this

Ninth Day of July 1985

[SEAL]

Attest:

DONALD J. QUIGG

Attesting Officer   Acting Commissioner of Patents and Trademarks